United States Patent [19]
Patchell

[11] 3,810,729
[45] May 14, 1974

[54] APPARATUS FOR IMPROVING THE REGULARITY OF EMBOSSMENTS ON THIN POLYMER FILM

[75] Inventor: Albert George Patchell, Welwyn Garden City, England

[73] Assignee: Smith & Nephew Research Limited, Harlow, Essex, England

[22] Filed: May 5, 1972

[21] Appl. No.: 250,623

[30] Foreign Application Priority Data
May 7, 1971   Great Britain.................... 13818/71

[52] U.S. Cl................. 425/308, 425/325, 425/362, 264/284
[51] Int. Cl............................................. B29d 7/22
[58] Field of Search .......... 425/294, 308, 325, 328, 425/362; 264/284

[56]     References Cited
         UNITED STATES PATENTS
2,976,567   3/1961   Jones et al. ........................ 264/146
3,318,368   5/1967   Lemper............................... 164/282
3,374,303   3/1968   Metz, Jr. .......................... 264/284 X
3,422,492   1/1969   Gorecki ........................... 425/328 X FOREIGN PATENTS OR APPLICATIONS
44-21989    9/1969   Japan................................. 264/146

Primary Examiner—R. Spencer Annear
Attorney, Agent, or Firm—Dike, Bronstein, Roberts & Cushman

[57]              ABSTRACT

A hot melt film of plastic is embossed and cooled in the nip between a rotatable embossing surface and a rotatable cooperating surface at least one of which surfaces is generally resilient but resistant to purely local deformation, and is preferably a smooth hollow metal cylinder with a thin enough wall to flex and thereby accommodate small thermal or pressure distortions in the other surfaces.

8 Claims, 5 Drawing Figures

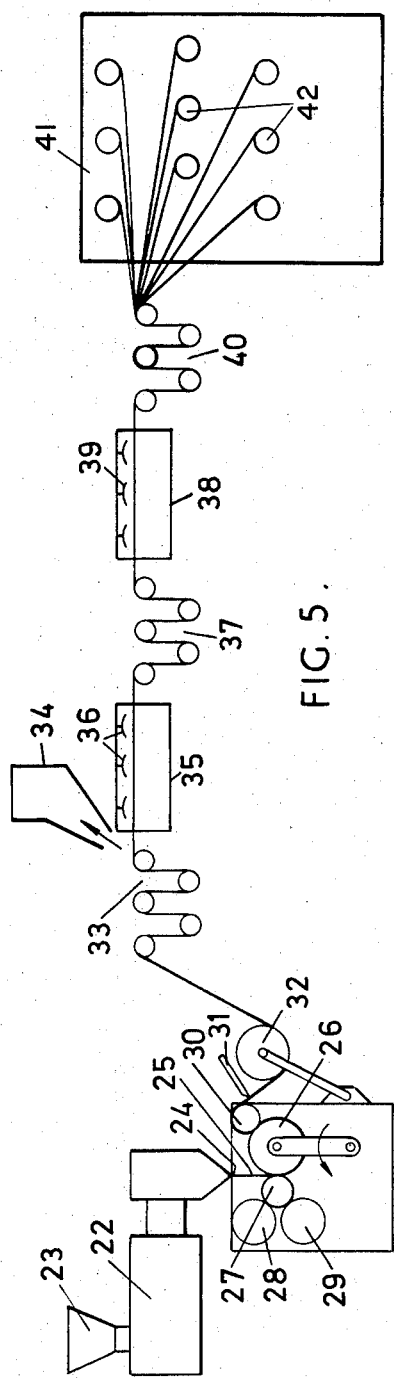
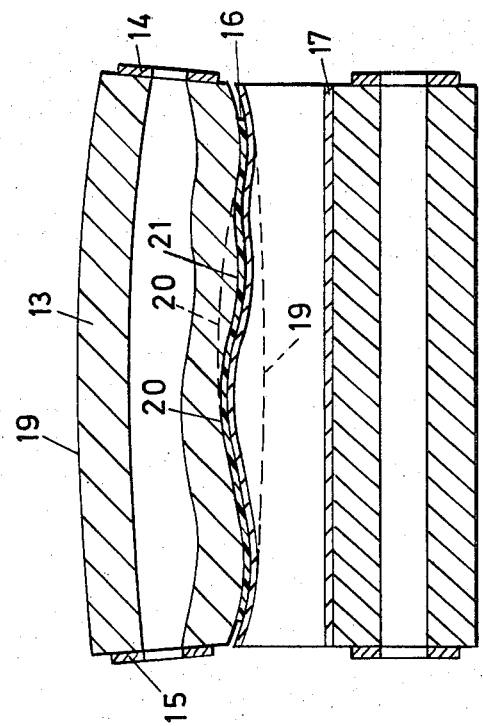

APPARATUS FOR IMPROVING THE REGULARITY OF EMBOSSMENTS ON THIN POLYMER FILM

This invention relates to the provision of a profile or pattern upon synthetic plastic film (either provided as an existing film or as a hot melt extruded as a film from a slot die) passing through the nip of two co-operating rollers.

In particular the invention relates to an arrangement whereby two precision co-operating rollers are provided in such a way as to give uniform pressure and clearance conditions along their length.

The main field in which the invention may be utilised is in the production of synthetic plastic textile materials from polypropylene, polyamide, high density polyethylene or like cold-drawable plastics directly from an extruded hot melt.

Such textile materials can, as is already known in the art, be provided either in the form of a net or in the form of fibres. The net is produced by stretching a sheet which is embossed or recessed with a regular pattern of embossments or depressions and subsequently stretched in such a way as to provide an open network structure of drawn strands connecting relatively undrawn and unoriented bosses. The fibres are produced by providing a more or less longitudinal patterning, for example a pattern of longitudinal ribs and grooves, on a sheet of film as it passes while still molten through the nip of two rollers and by subsequently stretching this film so that the material fibrillates and splits between the ribs so that each rib on the film forms a fibre, in many instances totally separate from adjacent fibres.

As far as the "net" aspect of the invention is concerned, an advantage of the present invention is that it provides a method of uniformly embossing a hot melt completely across its width as it is extruded from a flat die so that there is little or no wastage at the edge areas. As far as the "fibre" aspect of the invention is concerned the invention provides a way of exerting uniform pressure across the whole face width of the rollers so that, for example, the depths of the grooves, i.e., the membrane thickness at the bottom of the grooves, is uniform whereby effective and clean splitting between the ridges can be obtained on stretching to provide a fibre of uniform quality.

If two rollers are journalled to extend parallel to one another with their surfaces in contact, and urged towards one another to exert pressure at the nip, the precision of such a system is for most purposes fully adequate. However, for high precision uses small differences in roller diameter can have an effect upon the material passing through the nip. This is especially so if the material passing through the nip has a thickness of the order of a few thousandths of an inch. On a cylinder of say six inches diameter it is possible for surface inequalities, for example arising from polishing to amount to more than one thousandth of an inch.

If one of such rollers is patterned, the effect are even more noticeable, since in some places the impressed pattern may extend almost through the film and in other places it may extend only part of the way through the film. The absolute sizes of the differences are small, but their effect upon future processing of the film can be considerable if it is desired to obtain splitting of the film at any depressed portions.

These effects are increased when one or both of the rollers is heated, in that any measurements made to test the accuracy of the rollers before installation will of necessity be made upon the cold roller and may be rendered inaccurate by the temperature rise. Quite apart from any inequalities occuring in a more or less random fashion at the roller surface, there is a general tendency if a heated roller is journalled at two somewhat colder bearings for the roller to expand in the middle more than at the ends and have a "barrel shaped" longitudinal cross section. Once again, these effects are very small, of the order of one or two thousandths of an inch, but that these small differences are sufficient to cause non-uniformity in certain film patterning processes especially when carried out upon a hot melt film passing into the nip.

Other causes of non-uniformity of the nip arise from "bowing" of the rollers in use, either due to gravity acting on a long roller supported only at the ends or due to the pressure exerted by the follers on each other.

There have been proposals in various fields of prior art to use rubber rollers in treating materials passing through the nip. Clearly the use of such rubber rollers would render pressure conditions along the nip uniform, but there are difficulties with heat transfer which render the use of rubber impracticable for embossing heated materials unless extensive external cooling of the back surface of the roller is provided. Moreover, we have found that in patterning very thin plastic films, entering the nip between a patterned metal roller and a smooth rubber roller as a hot melt, the deformation of the soft roller surface can in some cases cause a local deformation upon the back of the thicker portions of the film, whereby the eventual clean splitting apart of the film at thinner portions and the uniformity of fibres produced is prejudiced. Moreover the known proposal of a rubber roller which has a loose metal band mounted upon it to form a nip with a grooved co-operating roller, is of particular value only for impressing an already formed film. Such a relatively loose arrangement would not be applicable to processing a hot melt since material would build up in front of the relatively loose nip and affect the deformation of the film.

The present invention sets out to overcome these difficulties and provides in one aspect apparatus for producing a regular embossed profile on a hot melt film of synthetic plastic passing into and being cooled within a profiling between two co-operating surfaces, wherein at least one of the surfaces comprises a roller arrangement having a surface non-yieldable to local deformation but being resilient by virtue of the elastic flexural deformation across the diameter of a hollow tubular member.

The apparatus according to the invention presents itself in two main forms.

In the simpler form, there is provided apparatus in which a nip is defined between a roller and a smooth hollow cylinder with a surface non-yieldable to local deformation, the external diameter, internal diameter, and material of which cylinder are such that the cylinder can resiliently deform to accommodate differences in dimension of the roller. Preferably the roller, but possibly the cylinder can be profiled to pattern the film.

By way of example, a metal cylinder made of steel for example can be provided of between 1 and 6 inches in external diameter and with a wall thickness of from 5 to 40 hundredths of an inch.

Such a cylinder need not be mounted at the ends, and can be provided with an underlying support for free rotation while being pressed against the co-operating roller by a backup roller. An alternative arrangement is to support the hollow cylinder upon an internal bar extending along the whole length and around which the hollow cylinder slides. Another possible arrangement is to use two spaced back-up rollers (parallel to the cylinder and each other, and holding the cylinder between them and the first mentioned roller) and thereby dispense with any separate support.

The non-yieldable surface on the metal cylinder is an important feature of the invention, as is the fact that the cylinder should only deform below its elastic limit.

The hollow cylinder can be made of any metal and for many purposes is preferably made of bronze.

The second and more complex form of the invention provides a base cylinder, precision tubing wound over the base cylinder in a helical arrangement, or an arrangement of parallel circumferential annuli, and a metal sleeve surrounding and contacting the precision tubing. The external appearance of this roller is that of the conventional roller having a relatively thick wall and water cooling arrangement within it. However, the arrangement of wound tubing provides for flexing of the external surface of the metal sleeve against a co-operating roller.

Such a roller of essentially three-part construction is in itself a feature of the present invention since it constitutes a viable article of commerce in replacement for a conventional roller.

Once again, usually the co-operating roller but possibly the three-part roller can be suitably profiled.

The wound tubing may be cylindrical in cross-section. However, since cylindrical tubing has only line contact with the outer sleeve it is also envisaged for the tubing to be elliptical in cross-section with the major axis parallel to the surface of the base roller, or to be flattened in cross-section where it touches the base roller and the sleeve with the remainder of the tubing being concave outwards or inwards. By way of example, such a second roller in the present apparatus can be from 4 to 8 inches in external diameter and have a wall thickness of between ½ and 1 inch whereby it is effectively generally unflexed by the contact pressure, but wherein the tubing flexes across its diameter.

The profiled roller can have a plurality of circumferential parallel grooves from say 10 grooves per inch down to 500 grooves per inch, and generally between 100 and 250 grooves per inch. It is desirable when using such a roller to press the grooves and ribs into the hot melt film so that, starting with a film of say 2 to 20 thousandths of an inch thickness (e.g., from 50 to 500 $\mu$) it is possible to impress upon the film in a uniform manner across the whole width of the whole roller grooves which terminate in a uniform manner at a depth from 5 to 10 $\mu$ from the ungrooved side.

The embossing process can be carried out at a pressure of from 5 to 50 lbs per linear inch of the nip, with the melt being extruded at from 200° to 350°C and the profiled roller being operated at 70° to 100°C. The temperature of the co-operating roller arrangement may be controlled by internal cooling means e.g., oil circulation and approach the crystalline melting point of the material.

It will be apparent therefore that the invention in another aspect provides a method of profiling a hot melt film of synthetic plastic material with repeated profiling of uniform depth across the whole profiled area, wherein the film is pressed while molten, and cooled, against a roller surface non-yieldable to local deformation but generally resilient by virtue of the elastic flexural deformation across the diameter of a hollow tubular member.

Such a method can be used to emboss polypropylene, high density polyethylene, polyamides or polyesters or indeed any plastic.

Another aspect of the present invention, which will be described in more detail below, consists in apparatus for producing a synthetic plastic textile fibre, comprising in sequence: an extruder for molten synthetic plastic having a slot die to produce an extruded synthetic plastic film; a first roller having a plurality of circumferential parallel grooves, and a second roller arrangement having a surface non-yieldable to local deformation but generally resilient by virtue of the elastic deformation across the diameter of a hollow tubular member, defining a nip with said first roller into which the molten film passes and is profiled with parallel longitudinal grooves and cooled; means for splitting the solidified film into parallel tapes each comprising a plurality of such parallel longitudinal grooves; a stretching zone, provided with heating means, wherein the tapes may be stretched so that splitting of the tapes down their grooves may be at least initiated; and a wind-up zone wherein the at least partially split-up bundles of regular filaments produced may be separately wound-up.

Although the invention has been generally described above in relation to the production of fibres with a suitably circumferentially ribbed and grooved roller, it can also be used with a regularly embossed roller with which recesses or embossments are formed in the film whereby the film can be subsequently stretched to form a net.

The invention will be further described with reference to the accompanying drawings, wherein:

FIG. 4 shows diagrammatically and in a greatly exaggerated form the types of roller deformation that can be accommodated by an embodiment of the invention;

FIG. 5 shows diagrammatically apparatus incorporating equipment similar to that shown in FIG. 2 for producing textile quality fibres.

Figure 1:
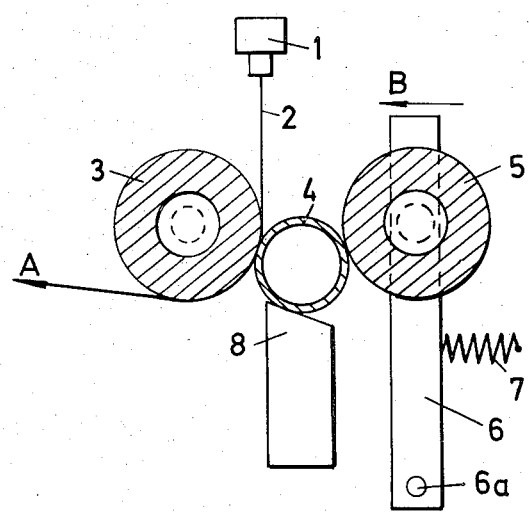
FIG. 1 shows in diagrammatic cross-section one form of roller arrangement according to the invention.

In the embodiment shown in FIG. 1 an extruder 1 extrudes a hot melt of synthetic plastic as a flat film 2 into the nip between a grooved embossing roller 3 and a smaller diameter cylinder 4. As will be apparent from the drawing cylinder 4 is of relatively low wall thickness. The film passes from the nip away in the direction of the arrow A. Driven back-up roller 5 urges the cylinder 4 against the roller 3 by virtue of its mounting upon arm 6 pivoted at 6a and subjected to the action of compression spring 7 to move in the direction shown by arrow B. The cylinder 4, which in the embodiment shown can be considered as a smooth thin wall cylinder is supported upon an underlying support channel 8.

By way of example, the film can be a polypropylene film and be passed at a rate of 50 ft./min. at 20 lbs per linear inch pressure through the nip. Roller 3 may be 6 inches diameter and grooved with 100 circumferential annular grooves per inch to provide grooves of the order of 5 thousandths inch deep. An operating temperature may be 60° - 100°C, e.g., 90°C. Cylinder 4 can be a bronze cylinder 2 inches external diameter and 3 mm. (0.13 inches) wall thickness, operated at 150° - 160°C. Cylinder 4 can again be about 6 inches diameter and be water cooled to about 90°C. Such an arrangement is capable of flexing approximately 0.001 inch at the nip for each 10 pounds per linear inch of pressure. It will be apparent from the drawing that the centre of cylinder 4 is somewhat below the line of centres of the rollers 3 and 5.

Of course, although not shown in the drawing, it would be possible to mount the cylinder upon a rod passing within the cylinder so that internal surface of the cylinder could slide over the rod as the rod is rotated.

Figure 2:
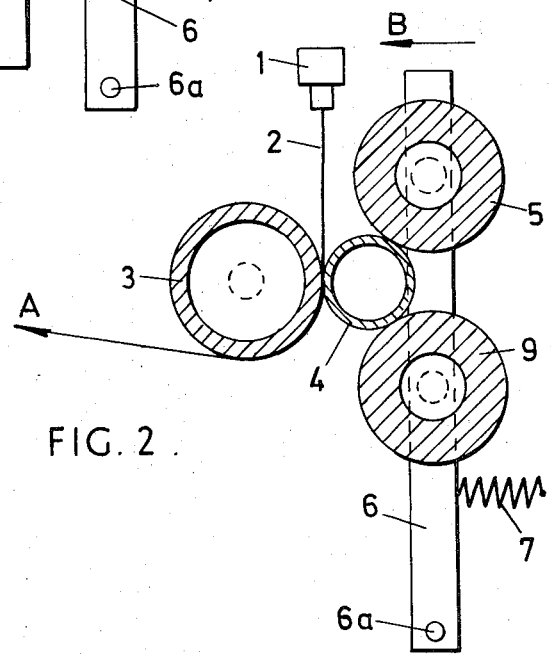
FIG. 2 shows in diagrammatic cross section another form of roller arrangement according to the invention.

The embodiment shown in FIG. 2 is essentially similar except that two driven back-up rollers 5 and 9 are provided, in the embodiment shown upon the same arm 6 similarly provided with a compression spring 7. In this case there is no necessity for any support member since the cylinder 4 is held between the depression defined by the two rollers 5 and 9.

Figure 3:
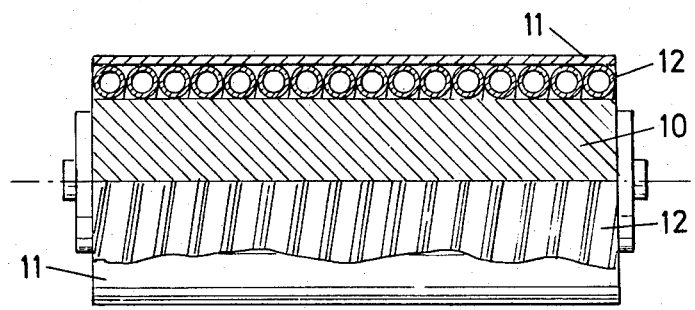
FIG. 3 shows partly in section and partly broken away a further roller which can be utilised according to the present invention.

FIG. 3 shows a somewhat different embodiment of the invention with the co-operating roller and extruder and mounting being omitted. The roller as shown in FIG. 3 consists of a central portion 10, which in the embodiment shown is solid but can equally well be a thick-walled but hollow core, and an outer surface shell 11. These are separated by a winding of precision steel tubing 12 which is helically wound upon the core 10.

Although the embodiment shown in FIG. 3 is different in construction from the embodiment shown in FIGS. 1 and 2, all embodiments rely upon the flexural resilience of tubular members which in the embodiments shown are circular in cross-section. That is to say, the flexural resistance of tubing 12 to transverse deformation fulfils the same function as the flexural resistance of the cylinder 4. Of course, in all this, the elastic limit should not be exceeded.

FIG. 4 shows in plan view the type of roller deformations which may arise with a heated roller 13 supported on bearings 14 and 15 at each end and forming a nip containing film 16 with a thin-walled smooth cylinder 17 which is backed by roller 18.

Differential heating can lead to a "barrel" shaped distortion 19 of the outer surface. This can be further modified by the bowing of the roller over the region of applied pressure at 20, and a similar possible bowing not shown, but due to gravity and acting at right angles to the plane of the paper. Also, local machining or heat expansion distortions, as at 21, can also occur. These various distortions shown in relation to the equipment of FIG. 1 can be accommodated by the equipment shown in FIGS. 1 to 3 so that the whole width of a film is uniformly treated.

FIG. 5 shows an extruder 22 with feed hopper 23 and slot die 24 extruding a molten film 25. This molten film passes into the nip between profiled pressure roller 26 and thin-walled cylinder 27 supported by back-up rollers 28 and 29, rather as shown in FIG. 2. The solidified and profiled film provided with parallel longitudinal groove of uniform depth is taken off wound idler roller 30, slit into tapes by knives 31 and passed over roller 32 to change direction.

The tapes are then passed over a set of godet rollers 33 and a fume hood 34 draws off any remaining vapour. They are thereafter pulled through the stretching oven 35 with infra-red heaters 36 by godets 37 rotating faster than the godets 33. A similar oven 38 with heaters 39 is provided for a heat-setting stage, and the tapes are drawn through this oven by godets 40. Finally, wind-up stage 41 with a plurality of rollers 42 takes off each tape separately. By this stage they are at least partially split apart into filaments, and in practice very largely split up. The tapes from the edge of the film are as acceptable in this regard as those from the centre.

I claim:

1. Apparatus for producing a plastic fibre, comprising an extruder for molten synthetic plastic; a first roller having a plurality of circumferential parallel grooves; a smooth-surfaced open-ended hollow metal cylinder having a hard, generally resilient surface that is resistant to local deformation, said cylinder having an external diameter from 1 to 6 inches and a wall thickness from about 0.05 to about 0.4 inches whereby it is generally resilient by virtue of its elastic flexural deformation across the diameter thereof; a nip between said first roller and said hollow cylinder, said nip being adapted to receive and cool the molten film; means for splittng the thereby cooled film into parallel tapes each comprising a plurality of parallel longitudinal grooves; a stretching zone having heating means for stretching the tapes so that splitting of the tapes down their grooves may be at least initiated; and a wind-up zone for winding up the at least partially split-up bundles of regular filaments produced.

2. Apparatus for producing a regular embossed profile on a hot melt film of synthetic plastic, comprising a first surface and a second surface defining therebetween a profiling nip for receiving, profiling and cooling the hot melt film, at least one of the said surfaces being a smooth-surfaced open-ended hollow metal cylinder having a hard surface non-yieldable to local deformation and having an external diameter from 1 to 6 inches and a wall thickness from about 0.05 to about 0.4 inches, whereby it is generally resilient by virtue of the elastic flexural deformation across the diameter thereof.

3. Apparatus as claimed in claim 2 wherein said profiling is defined between a first roller and the smooth-surfaced open-ended hollow metal cylinder having said hard surface non-yieldable to local deformation, the external diameter, internal diameter and material of said cylinder being such that the cylinder can resiliently deform to accommodate differences in dimension of the roller.

4. Apparatus as claimed in claim 3 in which the first roller is adapted to emboss the film.

5. Apparatus as claimed in claim 3 further comprising a member for supporting said hollow cylinder and a roller for pressing said hollow cylinder against the first roller.

6. Apparatus as claimed in claim 3 further comprising a plurality of back-up rollers in spaced relation parallel to the hollow cylinder and to each other for holding the hollow cylinder between them and the first roller.

7. Apparatus as claimed in claim 3 wherein the first roller is provided with a plurality of circumferential parallel grooves at a spacing from about 10 to about 500 grooves per inch.

8. Apparatus as claimed in claim 3 wherein the first roller is provided with a regular pattern of discrete embossments.

* * * * *